United States Patent [19]
Duan et al.

[11] Patent Number: 5,834,554
[45] Date of Patent: *Nov. 10, 1998

[54] LAMINATING ADHESIVES FOR FLEXIBLE PACKAGING

[75] Inventors: Youlu Duan, Minneapolis; Douglas U. Gwost, Shoreview; Lowell Lindquist, St. Paul; Scott Rhein, Forest Lake; Thomas E. Rolando, Maple Grove; Sonja Stammler, St. Croix; Peter A. Voss, Plymouth; Michael J. Dockniak, Stillwater, all of Minn.

[73] Assignee: H. B. Fuller Licensing & Financing, Inc., Arden Hills, Minn.

[ * ] Notice: The term of this patent shall not extend beyond the expiration date of Pat. No. 5,610,232.

[21] Appl. No.: 613,804

[22] Filed: Mar. 5, 1996

[51] Int. Cl.$^6$ .................. C08J 3/00; C08J 3/20; C08L 75/00; C09J 4/00

[52] U.S. Cl. .................. 524/591; 156/331.1; 156/331.4; 156/331.7; 428/423.1; 428/423.5; 428/423.7; 428/424.2; 428/424.4; 428/424.6; 428/425.8; 524/539; 524/507; 524/839; 524/840

[58] Field of Search ............... 428/423.1, 423.5, 428/423.7, 424.2, 424.4, 424.6, 425.8; 156/331.1, 331.4, 331.7; 524/539, 591, 839, 840, 507

[56] References Cited

U.S. PATENT DOCUMENTS

| | | | |
|---|---|---|---|
| 3,870,684 | 3/1975 | Witt et al. | 260/75 NH |
| 3,920,598 | 11/1975 | Reiff et al. | 260/75 |
| 4,147,679 | 4/1979 | Scriven et al. | 260/29.2 TN |
| 4,540,633 | 9/1985 | Kucera et al. | 428/423 |
| 4,801,644 | 1/1989 | Coogan | 524/839 |
| 4,851,459 | 7/1989 | Ramalingam | 523/414 |
| 4,883,694 | 11/1989 | Ramalingam | 428/35.2 |
| 5,250,610 | 10/1993 | Hansel et al. | 524/591 |
| 5,334,690 | 8/1994 | Shafheutle et al. | 528/71 |
| 5,610,232 | 3/1997 | Duan et al. | 524/840 |

FOREIGN PATENT DOCUMENTS 1128568  9/1968  United Kingdom.

OTHER PUBLICATIONS

Aqueous Polyurethane Dispersions from TMXDI (Meta) Aliphatic Isocyanate, Feb. 1989, Cyanamid.

*Primary Examiner*—Patrick D. Niland
*Attorney, Agent, or Firm*—Vidas, Arrett & Steinkraus

[57] ABSTRACT

A process for the preparation of sulfonated polyurethane-urea polymers, which are useful film to film laminating adhesives for flexible packaging in which the urethane-urea polymer component has no amide linkages. The water-based sulfonated polyurethane prepolymers are processed at reduced temperatures and are substantially free of volatile and/or leachable contaminants.

22 Claims, No Drawings

LAMINATING ADHESIVES FOR FLEXIBLE PACKAGING

FIELD OF THE INVENTION

This invention relates to a process for the preparation of water-based polymers which are useful as film to film laminating adhesives for flexible packaging. The present invention also relates to water-based polymers which are particularly suitable for direct/indirect food contact applications.

DESCRIPTION OF THE PRIOR ART

It is generally known that water-based anionic polyurethane-urea polymers are useful laminating adhesives. References describing such include the following:

UK Pat. No. 1,128,568 (Farbenfabriken Bayer Aktiengesellschaft) disclose laminating adhesives wherein anionic polyesteramide polyols are used in the preparation of water-based sulfonated/carboxylated polyurethane-urea polymers. The NCO-terminated prepolymers are processed with acetone.

U.S. Pat. No. 5,334,690 (Hoechst Aktiengesellschaft, Fed.) disclose water-based sulfonated/carboxylated polyurethane-urea adhesives wherein the anionic groups are present in the polyol segment. The solvent-less prepolymers are processed at temperatures greater than 120° C.

U.S. Pat. No. 5,250,610 (Bayer Aktiengesellschaft) disclose carboxylated polyurethane-urea laminating adhesives wherein the preferred neutralizing agent is a tertiary amine.

U.S. Pat Nos. 4,851,459 and 4,883,694 (Century Adhesives Corp) disclose high performance water dispersible polyurethane laminating adhesives wherein the NCO-terminated prepolymers are dispersed in water and chain extended with peroxides containing hydrogen active atoms. In the preferred method of the invention, a tertiary amine is added to neutralize the anionic prepolymer.

In copending application 08/480,780, filed Jun. 7, 1995, there are disclosed anionic polyurethane dispersions obtained by water reaction chain extension of isocyanate terminated prepolymers prepared from sulfonated polyester polyols and diisocyanates at less than 90° C.

The prior art teachings disclose water-based anionic polyurethane-urea laminating adhesives processed with volatile and/or leachable contaminants. Contaminants such as cosolvents, urethane catalysts and amine chain extenders and/or terminators can be detrimental. An application where such contaminants should be avoided is in the development of film to film laminating adhesives having direct food contact.

Another disadvantage associated with the prior art teachings relates to processing temperatures and polymer composition. Elevated temperatures can increase the prepolymer's crosslink density through uncontrolled isocyanate side reactions. For example, as described in the "Encyclopedia of Polymer Science and Engineering," Vol. 13, page 252, isocyanates react with the NH group of urethanes, ureas and amides at 100°–140° C. to form allophanates, biurets and acyl ureas, respectively. This can be detrimental in the development of film to film laminating adhesives. For example, laminating adhesives are often coated on flexible films at high rates of speed, then dried and heat activated at reduced temperatures and dwell times. Under such conditions, polymers with higher crosslink densities generally have higher heat activation temperatures resulting in reduced peel strengths. Polymer composition can also increase the adhesive's heat activation temperature. To meet FDA requirements as stated in 21 CFR §175.300, there remains a need for water-based laminating adhesives which are substantially free of volatile and/or leachable contaminants and have reduced heat activation temperatures.

SUMMARY OF THE INVENTION

The present invention is directed to a process for the preparation of water-based sulfonated polyurethane-urea polymers comprising:

1) formation of a water dispersible NCO-terminated polyurethane prepolymer by reaction at a temperature of no more than 90° C. in the absence of solvent of:
   (a) a polyol component comprising at least one sulfonated polyester based polyol wherein the sulfonate groups thereof are present in the form of alkali metal salts, and
   (b) at least one diisocyanate compound;
2) dispersing the NCO-terminated polyurethane prepolymer in solvent-free water; and
3) chain extending the prepolymer by reaction with water.

To meet FDA requirements as stated in 21 CFR §175.300 for use in direct food contact applications, the present invention discloses water-based sulfonated polyurethane-urea polymers which are substantially free of volatile organic chemicals, leachable organic metal catalysts, tertiary amine catalysts and unreacted organic amine chain terminators and/or extenders.

In the present invention, high molecular weight sulfonated polyurethane-urea polymers are processed substantially free of volatile and/or leachable contaminants at reduced temperatures, generating water-based film to film laminating adhesives which are particularly suitable for direct/indirect food contact and durable-good applications.

It has been assumed the heat and pressure required to activate a polymer is directly related to its hydrogen bonding characteristics (molar cohesive energy) and crosslinking density. As the molar cohesive energy and crosslink density increases, so does the energy needed to heat activate the polymer. In support of this assumption, it has been observed that the presence of amide linkages, excess urea linkages and a higher crosslink density generally increases an adhesive's heat activation temperature. Surprisingly, the high molecular weight sulfonated polyurethane-urea polymers of the present invention are characterized as having unique strong but soft properties making them particularly useful film to film laminating adhesives for flexible packaging. The polymers have a shear storage modulus (G'), at 10 radians/sec, in a range from about $10^4$ dynes/cm$^2$ to about $10^6$ dynes/cm$^2$ at 25° C.

In order to meet performance requirements, such as adhesion, machinability, clarity, tunnel resistance, humidity resistance, heat resistance and cost, it may be desirable to formulate the water-based sulfonated polyurethane-urea polymers with compatible polymers, copolymers, or crosslinking agents, such as formulations comprising:

i) a water-based sulfonated polyurethane-urea polymer as previously described;
ii) at least one water dispersible non-polyurethane based polymer selected from the group consisting of acrylics, vinyl/acrylics, styrene/acrylics, vinyl acetates, vinylacetate/ethylene copolymers, sulfonated polyesters and mixtures thereof; and/or,
iii) at least one water dispersible polyfunctional crosslinking agent selected from the group consisting of isocyanates, aziridines, epoxies, carbodiimides and mixtures thereof.

The sulfonated polyurethane-urea laminating adhesives and formulations have good adhesion characteristics on substrates including paper, polyethylene, polypropylene, polyester, nylon, ethylene vinyl acetate, cellophane, polyvinyl chloride and metalized films.

The inventive water-based sulfonated polyurethane-urea laminating adhesives, which are substantially free of volatile and/or leachable contaminants, are particularly suitable for direct/indirect food contact and durable-good applications.

DETAILED DESCRIPTION OF THE INVENTION

The sulfonated polyester based polyols used in the preparation of the NCO-terminated polyurethane prepolymer have hydroxyl numbers, as determined by ASTM designation E-222-67 (Method B), in a range from about 20 to about 140, and preferably from about 55 to about 110. The sulfonated polyester based polyols are the type described in U.S. Pat. No. 5,334,690 (Hoechst Aktiengesellschaft, Fed.) and are obtained by the condensation of polycarboxylic acids, polyalcohols and at least one sulfonate diol and/or diacid. Examples include adipic acid, azelaic acid, succinic acid, suberic acid, phthalic acid, ethylene glycol, condensates of ethylene glycols such as diethylene glycol, triethylene glycol, tetraethylethylene glycol, and poly(ethylene glycol), butanediol, butenediol, propanediol, neopentyl glycol, hexanediol, 1,4-cyclohexane dimethanol, 1,2propylene glycol and 1-methyl-1,3-propanediol, 1,4-dihydroxybutane sulfonic acid, bis(2-hydroxyethyl)-5-sodiosulfoisophalate, succinaldehyde disodium bisulfite, sulfoisophthalic acid and sulfosuccinic acid. The preferred sulfonated polyester based polyol is based on 5-sulfoisophthalic acid monosodium salt, adipic acid and diethylene glycol.

Optionally, the polyol component may also include non-sulfonated polymeric polyols, in combination with the sulfonated polymeric polyols. The non-sulfonated polymeric component have hydroxyl numbers in a range from about 20 to about 140, and preferably from about 55 to about 110. The non-sulfonated polymeric polyol component can be selected from the group consisting of polyester polyols, polyether polyols, polyester-ether polyols, polycarbonate polyols, polyurethane polyols, polyacetal polyols, polyacrylic polyols, polycaprolactone polyols, polythioether polyols, and mixtures thereof. The preferred non-sulfonated polymeric polyols are the polyester-ether based polyols based on diethylene glycol and adipic acid.

If desired, dihydroxy alkanoic acid may be used in the polyol component used in the preparation of the water dispersible NCO-terminated polyurethane prepolymer. The dihydroxy alkanoic acid component can be present in a range from about 0.1% by weight to about 5.0% by weight, and preferably from about 2.0% by weight to about 4.0% by weight based on 100 parts total solids. Examples include 2,2-dimethylolacetic acid, 2,2-dimethylolpropionic acid, 2,2-dimethylolbutyric acid and 2,2-dimethylolpentanoic acid. The preferred dihydroxy alkanoic acid is 2,2-dimethylolpropionic acid.

If present, the dihydroxy alkanoic acid groups can be converted to ionic groups (salt) before or after the NCO-terminated polyurethane prepolymer has been dispersed in water. Salts can be formed with a base selected from the group consisting of alkali metal salts, ammonia and mixtures thereof.

Small amounts of alkylene diols can also be included in the polyol component used in the preparation of the water dispersible NCO-terminated polyurethane prepolymer. The alkylene diol component can be present in a range from about 0.1% by weight to about 5.0% by weight, and preferably from about 2.0% by weight to about 4.0% by weight based on 100 parts total solids. The alkylene diol components have hydroxy numbers in a range from about 130 to about 1250, and preferably from about 950 to about 1250. Examples include diethyleneglycol, tetraethylene glycol, 1,4-butanediol, 1,6-hexanediol, cyclohexane dimethanol, furan dimethanol, glycerol, bis- (dihydroxyethyl) lauramide, polyethylene ether glycols, poly-1,2-propylene ether glycols, polytetramethylene ether glycols, poly-1,2-dimethylethylene ether and mixtures thereof. The preferred alkylene diols are 1,4butanediol and 1,6-hexanediol. If present, it is surmised the small molecular weight diols (hard segment) increase the polymers molar cohesive energy enhancing thermal and mechanical resistance.

The diisocyanates used in the preparation of the water dispersible NCO-terminated polyurethane prepolymer can be selected from the group consisting of linear aliphatic, cyclic aliphatic, aromatic and mixtures thereof. Examples include ethylene diisocyanate, propylene diisocyanate, 1,6-hexamethylene diisocyanate (HDI), trimethylene diisocyanate, cyclopentylene diisocyanate, cyclohexylene diisocyanate, dicyclohexylmethane diisocyanate, phenylene diisocyanate, norbonane diisocyanate, toluylene diisocyanate, 2,4'-and the 4-4'-isomers of diphenylmethane diisocyanate, isophorone diisocyanate, tetramethylene diisocyanate, polyethoxylated diisocyanates, polypropoxylated diisocyanates, napthylene diisocyanate, and the diisocyanates, described in U.S. Pat. No. 3,920,598.

The preferred diisocyanates are selected from the group consisting of HDI, isophorone diisocyanate and mixtures thereof. In the preferred embodiment of the invention HDI is used in the prepolymer synthesis. HDI has a very high standard vapor pressure of 6.8 ppm. To reduce the risk of worker exposure to inhalation, as well as to minimize undesirable side reactions which may be detrimental to the film-to-film laminating properties of the adhesive, it is important not to exceed a temperature of 90° C. during the prepolymer synthesis reaction.

The NCO-terminated prepolymer is prepared by reacting a stoichiometric excess of diisocyanate with said polyol component. The materials are processed at temperatures ranging from about 0° C. to about 90° C., and preferably from about 65° C. to about 85° C. The reactants are in such proportions that the resulting percent isocyanate is in a range from about 1.0% by weight to about 6.0% by weight, and preferably from about 2.0% by weight to about 4.0% by weight, based on 100 parts total prepolymer solids.

Once the NCO-terminated prepolymer has been formed, it is dispersed in distilled/de-ionized water with mild agitation. The water temperature before dispersing is in a range from about 5° C. to about 90° C., and preferably from about 25° to about 85° C.

The dispersed NCO-terminated prepolymer is then chain extended with water through partial hydrolysis. The isocyanate/water reaction liberates carbon dioxide, forming amino groups which then promptly react with non-hydrolyzed isocyanates to generate urea linkages. Partial hydrolysis is accomplished with dispersion temperatures in a range from about 5° C. to about 90° C., and preferably from about 45° C. to about 65° C.

The particle size (mean diameter) of the fully reacted waterbased sulfonated polyurethane-urea polymers are in a range from about 30 nanometer(nm) to about 500 nm, and preferably from about 40 nm to about 100 nm. The water-based dispersions of the inventive sulfonated polyurethane-urea polymers have a solids content in a range from about 20% by weight to about 45% by weight, and preferably from about 30% by weight to about 40% by weight.

In order to meet performance requirements such as adhesion, machinability, clarity, tunnel resistance, humidity resistance, heat resistance and cost, it may be desirable to formulate the water-based sulfonated polyurethane-urea polymers with nonpolyurethane based polymer dispersions. The non-polyurethane based polymers can be selected from the group consisting of water-based acrylics, vinyl/acrylics, styrene/acrylics, vinyl acetates, vinyl-acetate/ethylene copolymers and mixtures thereof. The formulations generally have a weight ratio of polyurethane-urea polymer to non-polyurethane polymer in a range from about 9:1 to about 1:9, and preferably from about 75:25 to about 25:75.

Optionally, small amounts of water dispersible polyfunctional crosslinking agents can be added. Crosslinking agents can be selected from the group consisting of isocyanates, aziridines, epoxies, carbodiimides and mixtures thereof. The preferred crosslinking agents are polyfunctional aziridines. The crosslinking agents are present in a range from about 1% by weight to about 20% by weight, and preferably from about 3% by weight to about 7% by weight, based on 100 parts total solids. It is surmised that when crosslinking agents are added to the adhesive composition, an interpenetrating or interconnected network is formed. The resulting networks enhance heat, moisture and solvent resistance properties. A surprising feature of the invention is crosslinked adhesives show stability to gelation and/or sedimentation even after 7 days.

The adhesives of the invention may be used on conventional lamination machines for preparing flexible film packaging laminates. A typical process for laminating polyester (PET) film to low density polyethylene (LDPE) is to roll coat the adhesive onto PET at a line speed of 91 meters/min, dry the adhesive in a 5.5 meter oven containing gas impingement driers at approximately 86° C. The secondary LDPE film is mated with the adhesive coated PET film and nipped at 93° C. with 200 psi pressure to give the laminate product. A typical process for laminating PET to polypropylene or aluminum foil is given in Example 3, below.

The present invention is illustrated by the following non-limiting examples.

EXAMPLES

Example 1

This example describes the synthesis of a preferred water-based laminating adhesive which is substantially free of volatile and/or leachable contaminants.

To a reaction flask was charged 667.8 grams (0.65 hydroxy equivalents) Rucoflex® XS-5570-55 which is a sulfonated polyester polyol from Ruco Polymer Corporation, 36.3 grams (0.327 isocyanate equivalents) isophorone diisocyanate and 54.9 grams (0.80 isocyanate equivalents) hexamethylene diisocyanate. The mixture was heated to 80° C. for approximately 2.5 hours. When the isocyanate content reached approximately 2.6%, the NCO-terminated sulfonated polyurethane prepolymer was dispersed in 1138 grams de-ionized/distilled water. The water temperature before dispersing was 40° C. The resulting dispersion had a pH of 6.5 and a viscosity less than 100 mPas.

The polyurethane dispersion of this example had zero VOC and was free of contamination from solvents, polyurethane catalyst, dispersing tertiary amine, and amine functional chain extender or chain terminator compounds, thus making it particularly suited for use as a laminating adhesive for food contacting packaging films.

Example 2

This example describes the synthesis of a water-based polymer useful as a laminating adhesive for flexible packaging.

To a reaction flask was charged 47.7 grams (0.46 hydroxy equivalents) of Rucoflex® XS-5570-55, 225.0 grams (0.14 hydroxy equivalents) Rucoflex® S-1011-35 which is a polyester-ether based polyol, 10.05 grams (0.15 hydroxy equivalents) dimethylolpropionic acid, 11.25 grams (0.22 hydroxy equivalents) 1,4-butanediol, 31.08 grams (0.02 isocyanate equivalents) isophorone diisocyanate and 47.04 grams (0.69 isocyanate equivalents) hexamethylene diisocyanate. The mixture was heated at 70° C. for 2.5 hours then dispersed in 698.5 grams (70° C.) deionized/distilled water containing 4.0 grams sodium hydroxide. The dispersion was stirred an additional 2 hours at 65° C. to complete chain extension through partial hydrolysis.

The polyurethane dispersion of this example had zero VOC and was free of contamination from solvents, polyurethane catalyst, dispersing tertiary amine, and/or amine functional chain extender or chain terminator compounds, thus making it particularly suited for use as a laminating adhesive for food contacting packaging films.

Example 3

This example describes adhesion testing with the polymer products prepared according to Examples 1 and 2.

Using a geometric C/L 400 coater/laminator, the adhesive was coated on polyester film (PET) at a line speed of 27.4 meters/min then passed through a dual zone drying tunnel at 165° F. (74° C.). The dried adhesive/PET film was then mated, using a combining nip at 60 psi (414 kPa) at a temperature of 175° F. (80° C.), with a secondary film consisting of either polypropylene (PP) or aluminum foil (FOIL). The laminates were cut into 2.5 cm by 17.8 cm strips and tested for 180° peel values using a Thwing Albert 225-1 at a crosshead speed of 30.5 cm/min. Peel values were tested after 1 day and several days aging. The results are reported in Table 1 below.

TABLE 1

Adhesive Bonding Strengths

| Sample | Aging (hours) | Peel Strength (g/cm) PET/PP | PET/FOIL |
|---|---|---|---|
| Product of Example 1 | 24 | 216 | 200 |
|  | 192 | 293 | SF[1] |
| Product of Example 1 with 2% polyisocyanate crosslinker[2] | 24 | SF | SF |
|  | 192 | 260 | SF |
| Product of Example 2 | 24 | 177 | 180 |
|  | 96 | 287 | 181 |
|  | 720 | 315 | 204 |

[1]SF = substrate failure
[2]WD-6314 from HB Fuller Co.

Table 1 surprisingly shows that adhesives of the invention, even when the polyol component is only a sulfonated polyester polyol and even when no crosslinker is used, give excellent bonding strength on both PET/PP and on PET/foil laminates. Another surprising result is that the adhesive formed from the product of Example 1 and the polyisocyanate crosslinker had a pot-life of more than 7 days.

What is claimed is:

1. A process for the preparation of sulfonated polyurethane-urea dispersions useful as laminating adhesives suitable for direct/indirect food contact and durable-good applications, said process comprising the steps of:
   a) forming a water dispersible NCO-terminated polyurethane prepolymer consisting essentially of the reaction product of;
      i) at least one sulfonated polyester polyol wherein the sulfonate groups thereof are present in the form of alkali metal salts; and
      ii) a polyisocyanate component comprising at least two diisocyanates, wherein one of the diisocyanates is hexamethylene diisocyanate (HDI);
   b) dispersing the prepolymer in solvent-free water; and
   c) reacting the prepolymer with water;
wherein said prepolymer is formed at a temperature less than about 90° C. in the absence of solvent.

2. The process as described in claim 1 wherein said prepolymer is formed at temperatures in a range from about 65° C. to about 85° C.

3. A laminating adhesive comprising a dispersion prepared by the process of claim 1.

4. The process of claim 1 wherein said adhesive is free of amide linkages.

5. A laminating adhesive as in claim 3 having a shear storage modulus (G') from about $10^4$ dynes/cm$^2$ to about $10^6$ dynes/cm$^2$ at 25° C. and a frequency of 10 radians/sec.

6. The process of claim 1 wherein the sulfonated polyol is selected from the group consisting of sulfonated polyester based polyols, sulfonated polyesterether based polyols and mixtures thereof.

7. The process of claim 6 wherein said sulfonated polyester polyol is based on 5-sulfoisophthalic acid monosodium salt, adipic acid and diethylene glycol.

8. The process of claim 1 wherein at least one diisocyanate is selected from the group consisting of linear aliphatic diisocyanates, cyclic aliphatic diisocyanates, aromatic diisocyanates and mixtures thereof.

9. The process of claim 1 wherein at least one diisocyanate is isophorone diisocyanate (IPDI).

10. The laminating adhesive as described in claim 3 further comprising at least one water dispersible polyfunctional crosslinking agent elected from the group consisting of isocyanates, aziridines, epoxies, carbodiimides and mixtures thereof.

11. The laminating adhesive as described in claim 10 wherein said crosslinking agent is present in the composition in an amount from about 3% by weight to about 7% by weight, based on 100 parts total solids.

12. The laminating adhesive as described in claim 3 further comprising at least one water dispersible non-polyurethane based polymer selected from the group consisting of acrylics, vinyl/acrylics, styrene/acrylics, vinyl acetates, vinyl-acetate/ethylene copolymers, sulfonated polyesters and mixtures thereof.

13. The laminating adhesive as described in claim 12 wherein the weight ratio of water-based polyurethane-urea polymer to non-polyurethane polymer is in a range from about 75:25 to about 25:75.

14. The laminating adhesive as described in claim 13 comprising at least one water dispersible polyfunctional crosslinking agent selected from the group consisting of isocyanates, aziridines, epoxies, carbodiimides and mixtures thereof.

15. The laminating adhesive as described in claim 14 wherein said crosslinking agent is present in the composition in an amount from about 3% by weight to about 7% by weight, based on 100 parts total solids.

16. A method of laminating a pair of substrates comprising applying a composition as in claim 3 to one of said substrates, drying said composition and then joining the two substrates with heat and pressure.

17. A bonded assembly prepared by the method of claim 16 wherein at least one of said substrates is a member selected from the group consisting of paper, polyethylene, polypropylene, polyester nylon, ethylene vinyl-acetate, cellophane, metalized films and polyvinyl chloride.

18. A laminating adhesive useful in direct food contact applications comprising an aqueous dispersion of a polyurethane/urea polymer obtained by reacting:
   a) a polyol component comprising at least one sulfonated polyester polyol wherein the sulfonate groups thereof are present in the form of alkali metal salts;
   b) a polyisocyanate component comprising at least two diisocyanates, wherein one of the diisocyanates is hexamethylene diisocyanate (HDI); and
   c) water
said dispersion being substantially free of volatile organic chemicals, leachable organic metal catalysts, tertiary amine catalysts and unreacted organic amine chain terminator or chain extender compounds.

19. The laminating adhesive of claim 18 wherein said adhesive is free of amide linkages.

20. A laminated article having an adhesive layer comprising a dried film of a dispersion as in claim 19.

21. The process of claim 1 wherein said dispersion is substantially free of volatile organic chemicals, leachable organic metal catalysts, tertiary amine catalysts and unreacted organic amine chain terminator or chain extender compounds.

22. The laminating adhesive of claim 3 which is substantially free of volatile organic chemicals, leachable organic metal catalysts, tertiary amine catalysts and unreacted organic amine chain terminator or chain extender compounds.

* * * * *

UNITED STATES PATENT AND TRADEMARK OFFICE
CERTIFICATE OF CORRECTION

PATENT NO. : 5,834,554

DATED : November 10, 1998

INVENTOR(S) : Youlu Duan, Douglas U. Gwost, Lowell Lindquist, Scott Rhein, Thomas E. Rolando, Sonja Stammler, Peter A. Voss, Michael J. Dochniak It is certified that error appears in the above-identified patent and that said Letters Patent is hereby corrected as shown below:

On On the title page, item at [75] Inventors: Michael J. Dockniak should be Michael J. Dochniak Signed and Sealed this Thirteenth Day of April, 1999

Attest:

Q. TODD DICKINSON

Attesting Officer

Acting Commissioner of Patents and Trademarks